United States Patent
Eliers et al.

(10) Patent No.: US 9,376,946 B1
(45) Date of Patent: Jun. 28, 2016

(54) MODAL ATTENUATOR

(71) Applicant: FISHER CONTROLS INTERNATIONAL LLC, Marshalltown, IA (US)

(72) Inventors: Daniel J. Eliers, Marshalltown, IA (US); Allen C. Fagerlund, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/677,591

(22) Filed: Apr. 2, 2015

(51) Int. Cl.
*F01N 1/02* (2006.01)

(52) U.S. Cl.
CPC ...................................... *F01N 1/026* (2013.01)

(58) Field of Classification Search
CPC .......................................................... F01N 1/02
USPC ................................. 181/207, 212, 227, 228
See application file for complete search history.

(56) References Cited

U.S. PATENT DOCUMENTS

| | | | |
|---|---|---|---|
| 821,828 A | 5/1906 | Phelps | |
| 822,127 A | 5/1906 | Hufnagel | |
| 1,342,978 A | 6/1920 | Young | |
| 1,909,511 A | 5/1933 | Wilson | |
| 2,016,253 A | 10/1935 | Noblitt et al. | |
| 2,073,951 A | 3/1937 | Servais | |
| 2,233,804 A * | 3/1941 | Bourne | 181/233 |
| 2,311,676 A | 2/1943 | Hamilton | |
| 2,326,612 A | 8/1943 | Bourne | |
| 3,142,354 A | 7/1964 | Kammerer et al. | |
| 3,175,640 A | 3/1965 | Matsui | |
| 3,233,697 A | 2/1966 | Games et al. | |
| 3,495,950 A | 2/1970 | Frost et al. | |
| 3,620,329 A | 11/1971 | Wenzlaff | |
| 3,791,483 A | 2/1974 | Vasiljevic | |
| 3,842,932 A | 10/1974 | Gibel | |
| 3,955,643 A * | 5/1976 | Clark | 181/248 |
| 4,091,892 A * | 5/1978 | Hehmann et al. | 181/286 |
| 4,134,472 A | 1/1979 | Trainor | |
| 4,346,781 A | 8/1982 | Ingard et al. | |
| 4,979,587 A | 12/1990 | Hirt et al. | |
| 5,162,620 A * | 11/1992 | Ross et al. | 181/220 |
| 5,183,974 A | 2/1993 | Wilhelm et al. | |

(Continued)

FOREIGN PATENT DOCUMENTS

| | | |
|---|---|---|
| EP | 1291570 A2 | 3/2003 |
| GB | 471431 A | 9/1937 |

OTHER PUBLICATIONS

Broukhiyan, "The Modal Coincidence Suppression Device (MCSD) for the Reduction of Noise from Control Valves;" 1983.

*Primary Examiner* — Forrest M Phillips

(74) *Attorney, Agent, or Firm* — Marshall, Gerstein & Borun LLP

(57) ABSTRACT

A modal attenuator includes annular chambers disposed between an attenuator body and a perforated screen surrounding a primary flow path. The modal attenuator in some arrangements is in the form of an expander section. In some arrangements one or both of the height and the width of the annular chambers may vary along the length of the attenuator body such that the volumes of the chambers vary along the length of the attenuator body. Each chamber preferably has an open end facing the perforated screen such that acoustic waves passing through the perforated screen can enter into the chamber through the open end.

16 Claims, 3 Drawing Sheets

(56) References Cited

U.S. PATENT DOCUMENTS

| | | | |
|---|---|---|---|
| 5,831,223 A * | 11/1998 | Kesselring | 181/227 |
| 5,909,016 A | 6/1999 | Sterling | |
| 6,116,375 A * | 9/2000 | Lorch et al. | 181/224 |
| 7,278,514 B1 * | 10/2007 | Quigley | 181/256 |
| 7,325,474 B2 | 2/2008 | Yoshimura et al. | |
| 7,367,424 B2 * | 5/2008 | Brown et al. | 181/250 |
| 7,497,301 B2 | 3/2009 | Cheng et al. | |
| 7,584,821 B2 * | 9/2009 | Prior et al. | 181/241 |
| 7,810,609 B2 * | 10/2010 | Sikes et al. | 181/250 |
| 7,934,581 B2 * | 5/2011 | Kim et al. | 181/250 |
| 8,348,012 B2 * | 1/2013 | Hwang | 181/229 |
| 8,511,427 B2 | 8/2013 | Dittmar et al. | |
| 8,931,591 B2 * | 1/2015 | Fagerlund et al. | 181/250 |

* cited by examiner

MODAL ATTENUATOR

FIELD OF THE DISCLOSURE

The present application is directed toward a modal attenuator, which in some arrangements may be used for reducing noise generated by fluid flowing through a process line, such as a pipe, valve, or regulator.

BACKGROUND

Fluid valves control the flow of fluid from one location to another. When the fluid valve is in a closed position, high pressure fluid on one side is prevented from flowing to a lower pressure location on the other side of the valve. The pressure differences between an inlet and an outlet of the control valve, along with a tortuous flow path through the control valve, produce turbulent fluid flow downstream of the control valve, which causes unwanted and potentially harmful noise.

In an attempt to reduce noise, multi-port cages or trims have been used in some regulators to reduce the pressure drop across the cage and to smooth downstream flow. However, these cage-type noise reducers also reduce fluid flow rates through the cage, which may reduce efficiency of the regulator.

Other types of sound reducing devices include materials disposed in the flow path that absorb sound waves and convert the sound waves to heat energy. However, such sound absorbing materials have limited effective frequencies and they also reduce fluid flow through the material.

Still other attempts have been made to reduce noise with attenuation devices located downstream of the regulator. In particular, a modal coincidence suppression device is described in "The Modal Coincidence Suppression Device (MCSD) For The Reduction Of Noise From Control Valves" by Ali E. Broukhiyan, hereinafter ("MCSD") which is hereby incorporated by reference herein. However, the modal suppression device disclosed in MCSD was very heavy and was difficult to assemble.

SUMMARY

According to some aspects of the present disclosure, a modal attenuator for reducing noise in a process system includes a plurality of chambers spaced along the length of an attenuator body, wherein the widths of the chambers increase in size from a first end chamber adjacent an inlet toward an intermediate chamber. Optionally, the widths of the chambers may decrease in size from the intermediate chamber toward a second end chamber adjacent an outlet.

According to some aspects of the present disclosure, a modal attenuator for reducing noise in a process system includes a plurality of chambers spaced along the length of an attenuator body, wherein the widths of the chambers decrease in size from a first end chamber adjacent an inlet toward an intermediate chamber. Optionally, the widths of the chambers may increase in size from the intermediate chamber toward a second end chamber adjacent an outlet.

According to some aspects of the present disclosure, a modal attenuator for reducing noise in a process system includes a plurality of chambers spaced along the length of an attenuator body, wherein the depths of the chambers are staggered.

In one arrangement, the inlet may be for in-line connection to a first pipe, the outlet is for optional in-line connection to a second pipe, and the attenuator body extends along the length from the inlet to the outlet and defines a primary fluid flow path from the inlet to the outlet. A perforated screen may be disposed inside the attenuator body. The perforated screen may surround the primary fluid flow path from the inlet to the outlet. The chambers may be defined between the attenuator body and the perforated screen. Each chamber may have a width, a height, and an open end facing the perforated screen such that acoustic waves passing through the perforated screen can enter into the chamber through the open end.

According to some aspects of the present disclosure, a modal attenuator is in the form of an expander section for inserting in-line between a first pipe having a first diameter and a second pipe having a second diameter larger than the first diameter. A perforated screen may be disposed inside an attenuator body, the perforated screen surrounding a primary fluid flow path from the inlet to the outlet. The primary fluid flow path may expand from the inlet toward the outlet. A plurality of chambers may be spaced along the length of an attenuator body. Each chamber may have a width, a height, and an open end facing the perforated screen such that acoustic waves passing through the perforated screen can enter into the chamber through the open end.

In one arrangement, the inlet has the first diameter and the outlet has the second diameter. The attenuator body extends along a length from the inlet to the outlet.

In addition, these aspects and arrangements may be include any one or more of the following additional aspects and arrangements.

In some arrangements, the plurality of chambers may include at least seven chambers spaced apart along the length the attenuator body. The plurality of chambers may include at least nine chambers spaced apart along the length the attenuator body. More or fewer chambers may be disposed along the length of the attenuator body.

In some arrangements, the heights of the chambers may increase progressively from each of the first end chamber and the second end chamber to the intermediate chamber. In some arrangements, the heights of the chambers may alternate along the length of the attenuator body between a larger height chamber and a smaller height chamber. The height and/or the width of the chambers may be successively smaller in a direction of flow from the inlet to the outlet.

In some arrangements, the widths of the chambers may be all the same. In other arrangements, some of the chambers are wider than other of the chambers.

In some arrangements, a first attachment flange may be disposed at the inlet to be connected to the first pipe. A second attachment flange may be disposed at the outlet to be connected to the second pipe.

In some arrangements, the chambers and/or the primary fluid flow channel may be at least partly defined by a plurality of annular walls disposed on an inside surface of the attenuator body. The walls may all have the same inside diameter defining a substantially cylindrical primary flow path. One or more of the walls may different inside diameters. Inner annular surfaces of the annular walls may increase in diameter from the inlet toward the outlet.

In some arrangements, a volume of each chamber decreases successively from a first end chamber adjacent the inlet with a largest volume to a second end chamber adjacent the outlet with a smallest volume.

In some arrangements, the perforated screen may include a screen body having a frustoconical shape. The shape of the screen body may be complementary to the inner diameters of the inner annular surfaces of the annular walls.

Additional aspects and arrangements will be discernible upon a thorough study of the attached drawings and the following detailed description thereof.

DETAILED DESCRIPTION OF THE DRAWINGS

According to some aspects of the present disclosure, a modal attenuator includes annular chambers disposed between an attenuator body and a perforated screen surrounding a primary flow path, wherein one or both of the height and the width of the annular chambers varies along the length of the attenuator body such that the volumes of the chambers vary along the length of the attenuator body.

According to some aspects of the present disclosure, a modal attenuator is in the form of an expander section including an attenuator body extending along a length from an inlet with a first diameter to an outlet with a second diameter and defining a primary fluid flow path that expands from the inlet toward the outlet, and a plurality of chambers spaced along the length of the attenuator body, the chambers defined between the attenuator body and a perforated screen, wherein each chamber has a width, a height, and an open end facing the perforated screen such that acoustic waves passing through the perforated screen can enter into the chamber through the open end.

Unless specified otherwise, any of the features or characteristics of any one of the embodiments of the modal attenuator disclosed herein may be combined with the features or characteristics of any of the other embodiments of modal attenuators.

Figures 1, 2:
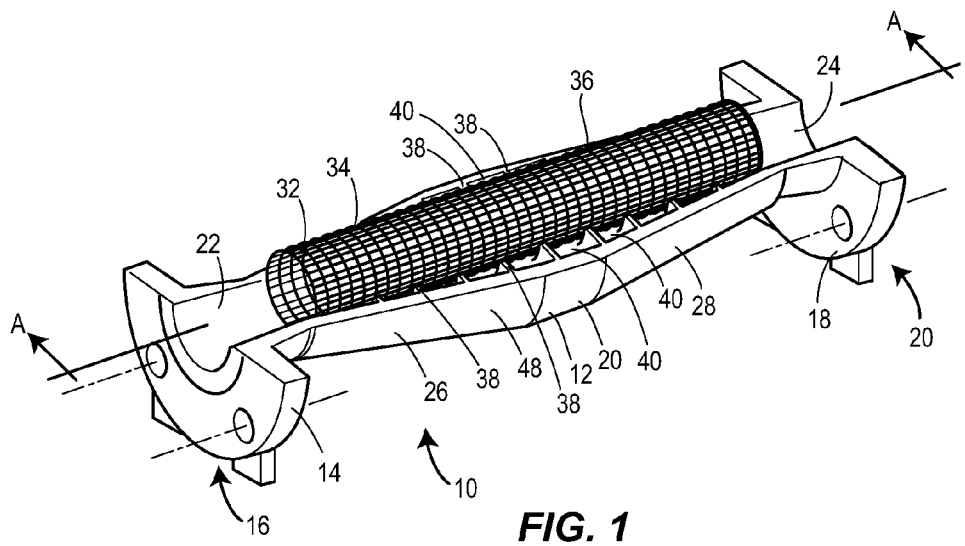
FIG. 1 is a cutaway perspective view of a modal attenuator according a one arrangement.
FIG. 2 is schematic longitudinal cross-sectional view along the lines A-A of FIG. 1 of a modal attenuator according to another arrangement.

Turning now to FIG. 1, a modal attenuator 10 according to some aspects includes a hollow attenuator body 12 and a perforated hollow screen 32 disposed inside the hollow attenuator body 12. The attenuator body 12 is preferably in the form of an elongate hollow tube-like member generally approximating a section of piping and preferably extends from a first attachment flange 14 at a first end 16 of the hollow attenuator body 12 to a second attachment flange 18 at a second end 20 of the hollow attenuator body 12. The first attachment flange 14 and the second attachment flange 18 are attachable in-line with process pipes and/or in-line with a regulator, valve, or other in-line processing equipment at one end and a process pipe or in-line processing equipment at the other end. Thus, the disclosed modal attenuators 10 are easily retrofitted on virtually any process system because there is no need to replace or modify the regulators or valves and the modal attenuator 10 attaches like any other pipe segment.

The attenuator body 12 may include an inlet portion 22 connected to the first attachment flange 14 and/or an outlet portion 24 connected to the second attachment flange 18. The inlet portion 22 and the outlet portion 24 may be substantially cylindrical in shape with a substantially constant inner diameter. For example, the inlet and outlet portions 22 and 24 may have the same inside diameter as process pipes to which the attachment flanges 14 and 18 are to be connected. A cone-shaped lead-in segment 26 may be attached to the inlet portion 22 and a cone-shaped lead-out segment 28 may be attached to the outlet portion 24. The lead-in segment 26 may have a smaller diameter proximate the inlet 22. The lead-out segment 28 may have a smaller diameter proximate the outlet 24. Stated another way, the lead-in segment may diverge in a direction of fluid flow through the attenuator body 12, and the lead-out segment 28 may converge in the direction of flow. The lead-in segment 26 may be joined to the lead-out segment 28 by a substantially cylindrical intermediate segment 30.

The perforated hollow screen 32 has an inner diameter that is preferably substantially the same as the inner diameter of the inlet 22 and/or the outlet 24. Thus, the screen 32 preferably has the same inside diameter as the pipe sections connected to opposite ends 16, 20 of the modal attenuator. The screen 32 preferably has a cylindrical screen body 34 including a plurality of perforations 36. In one exemplary embodiment, at least one, and up to all of the perforations 36 may be circular in shape. In other embodiments, the perforations 36 may take on other shapes, such as, for example, square, rectangular, triangular, polygonal, oval, or irregular. In other embodiments, the screen body 34 may be fully or partially coated with a sound absorbing material.

A plurality of annular walls 38 are disposed on an inner surface of the attenuator body 12, spaced apart from each other along length of the attenuator body. The walls 38 divide a space between the inner surface of the attenuator body 12 and an outer surface of the screen body 34 into a plurality of annular chambers 40. Each annular chamber 40 at least partly, and preferably completely extends around the outer surface of the perforated screen 32. Each annular chamber 40 has an open end at the inner annular ends of the annular walls 38. The open end faces the perforated screen 32 such that acoustic waves traveling through the perforations 36 can enter into the chambers 40 and reflected acoustic waves can exit the chambers through the open end and return toward the perforated screen.

Two or more of the chambers 40 define different volumes. It is believed that chambers 40 of different volumes may attenuate sound waves of different frequencies more or less effectively, depending on the volume of the chamber. In this manner, the modal attenuator 10 may be adapted to attenuate a broad range of acoustic frequencies and/or to attenuate certain selected acoustic frequencies more so than other acoustic frequencies.

In the embodiment of FIG. 1, a volume of the chambers 40 increases in the lead in segment 26 of the attenuator body 12 from the inlet 22 towards the intermediate segment 30. On the other hand, a volume of the chambers 40 decreases in the lead-out segment 28 from the intermediate portion 30 towards the outlet 24. However, this arrangement of increasing and decreasing volumes of the chambers 40 is only one exemplary arrangement having chambers 40 of varying volume along the length of the attenuator body 12. Additional arrangements are also possible and contemplated and can include different patterns and/or random or quasi-random placements of different volume chambers 40 along the length of the attenuator body.

Fluid moving through the interior of the modal attenuator 10, for example from the inlet portion 22 to the outlet portion 24, often carries and/or produces acoustic waves, e.g., noise. The acoustic waves often propagate radially outwardly. Thus, as fluid travels along the length of the interior (e.g., the inner diameter) of the screen body 24, acoustic waves travel outwardly, for example through the perforations 36, into the chambers 40. The walls 38 and chambers 40 are arranged to reflect the acoustic waves in the fluid moving through the modal attenuator 10 back towards an interior of the screen body 34, which results in disruption or cancellation of the reflected sound waves as they collide with other sound waves in the interior of the screen body 34. The openings 36 allow the sound waves to propagate back and forth between the interior of the screen body 34 and the chambers 40.

By controlling the volume of the chambers 40, for example by varying the width and/or height of each chamber, along with a distance between opposing chambers, certain frequencies of sound waves may be targeted for disruption. Each chamber 40 defines an annular space 46 between the screen body 34 and the attenuator body 12. Each annular space 46 has a width 47 and a height 49. Widths and heights may vary from chamber 40 to chamber 40. Thus, many different combinations of variation may be employed to modify the volumes of the chambers 40. For example, the widths of some or all of the chambers 40 may be held constant and only the heights of those chambers 40 may be varied. The heights of some or all of the chambers 40 may be held constant and only the widths of those chambers 40 may be varied. The heights of some or all of the chambers 40 may be varied, and the widths of those chambers 40 may also be varied.

In the arrangement of FIG. 1, the width of each chamber 40 is substantially the same, and the heights of the chambers 40 varies along the length of the attenuator body 12. The heights of the chambers 40 vary from the smallest heights at the chambers 40 adjacent the inlet 22 and the outlet 24 to the largest heights along the intermediate portion 30.

FIG. 2 illustrates another modal attenuator 110, which is similar to the modal attenuator 10 of FIG. 1, except that volumes of the chambers 40 are varied by varying both the height 49 and the width 47 of the chambers 40 along the length of the attenuator body 12. In this exemplary arrangement, identical or similar features are given the same reference number as in FIG. 1 for ease of reference, and the description thereof is the same as provided above, except as otherwise noted herein. Thus, the modal attenuator 110 includes an attenuator body 12 extending between an inlet 22 and an outlet 24, a perforated screen 32 having a cylindrical screen body 34 extending from the inlet 22 to the outlet 24 and a plurality of chambers 40 in the form of annular spaces 46 defined between annular walls 38 extending radially inwardly from the attenuator body 12.

The widths 47 of the chambers 40 increase in size from the chambers adjacent each of the inlet 22 and the outlet before toward the central area of the attenuator body 12. In this arrangement, seven chambers 40 are disposed spaced apart along the length of the attenuator body 12 between the inlet 22 in the outlet 24, although additional or fewer chambers 40 may be disposed along the length of the attenuator body. For example, the widths of the chambers 40 increase from the inlet 22 to the intermediate segment 30. In this example, the left-most chamber 40 adjacent the inlet 22 has a first width 47, the next chamber 40 adjacent to the right has a larger width 47, the next chamber 40 to the right as still a larger width 47, the central chamber 40, which is disposed fully within the intermediate segment 30, has the largest with 47. In addition, for example, the widths of the chambers 40 decrease from the intermediate segment 32 to the outlet 24. In this example, the width of the chamber 40 adjacent and to the right of the central chamber 40 has a smaller width 47, the next chamber 40 to the right has yet a smaller width 47, and the next chamber 40 on the right and of the attenuator body 12 has an even smaller width 47. The widths 47 of the left-most and right-most chambers may be equal or different from each other.

In addition to varying the widths 47 of the chambers 40, the heights 49 of the chambers 40 also vary along the longitudinal length of the attenuator body 12. Thus for example, the heights 49 of the chambers 40 increase progressively from each of the inlet 22 and the outlet 24 toward the intermediate segment 30. In this example, the central chamber 40 disposed within the intermediate segment 30 has the largest height 49, the left-most chamber 40 adjacent the inlet 22 has the smallest height 49 of any of the chambers to the left of the central chamber 40, and the right-most chamber 40 adjacent the outlet 24 has the smallest height 49 of any of the chambers to the right of the central chamber 40. The heights 49 of the left-most chamber 40 and the right-most chamber 40 may be the same or different from each other. The inside diameter surface of each of the walls 38 is preferably the same, substantially matching the inside diameters of the inlet 22 and the outlet 24, and defining a substantially cylindrical shape complementary to the screen body 34. The outside diameters of the walls 38 vary, preferably following the contour of the inside diameter of the attenuator body 12.

In this exemplary arrangement, the volumes of the chambers 40 are the largest in the central region of the attenuator body 12 and are smallest at the opposite left and right ends of the attenuator body. However, the volumes of the chambers 40 may be varied in other patterns, randomly, and/or pseudo-randomly. Further, the pattern of increasing and decreasing volumes and/or widths 47 and heights 49 of the chambers 40 is not limited to the pattern described with respect to this example. Rather, the widths 47 and/or the heights 49 of the chambers 40 may be selectively varied in different patterns and/or in random or pseudo-random patterns, for example to attenuate certain acoustic frequencies more strongly and/or attenuate various ranges of frequencies more or less, as desired.

Figure 3:
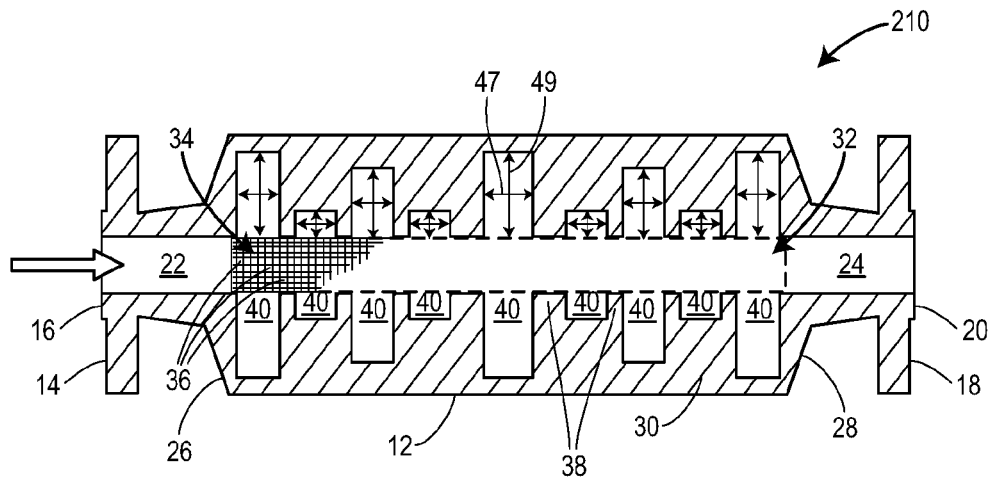
FIG. 3 is schematic longitudinal cross-sectional view along the lines A-A of FIG. 1 of a modal attenuator according to a further arrangement.

FIG. 3 illustrates another modal attenuator 210, which is similar to the modal attenuators 10 and 110, except that volumes of the chambers 40 are varied in a different pattern, having chambers 40 with alternating larger and smaller volumes along the length of the attenuator body 12. In this exemplary arrangement, identical or similar features are given the same reference number as in FIG. 1 or 2 for ease of reference, and the description thereof is the same as provided above, except as otherwise noted herein. Thus, the modal attenuator 210 includes an attenuator body 12 extending between an inlet 22 and an outlet 24, a perforated screen 32 having a cylindrical screen body 34 extending from the inlet 22 to the outlet 24 and a plurality of chambers 40 in the form of annular spaces 46 defined between annular walls 38 extending radially inwardly from the attenuator body 12. Unlike the previous examples, the attenuator body 12 has a relatively long intermediate segment 30 and relatively short lead-in and lead-out segments 26 and 28. In this exemplary arrangement, the intermediate segment 30 has a substantially cylindrical outer surface, and all of the chambers 40 are disposed along the intermediate segment 30 between the lead-in segment 26 and the lead out segment 28. However, in other arrangements, the shape of the attenuator body 12 may be more similar to the shapes shown in FIGS. 1 and 2 and some of the chambers 40 may be disposed along one or both of the lead-in and lead-out segments 26 and 28.

In this arrangement, the chambers 40 have staggered depths; that is, the heights 49 alternate along the length of the attenuator body 12 between a larger height chamber 40 and a smaller height chamber 40. Thus, for example, in the exemplary arrangement shown in FIG. 3, the heights 49 of the chambers 40 begin with a larger height (i.e., a greater depth) starting at the left-most chamber 40 adjacent the inlet 22, and alternatingly have a smaller height and a larger height. In some arrangements, all of the larger heights may be the same height and/or all of the smaller heights may be the same height. However, in other arrangements, the larger height chambers 40 may themselves have different heights, and/or the smaller height chambers 40 may themselves have different heights. In this arrangement, the heights of the chambers 40 may be selected such that different heights are used to attenuate different frequencies selectively. The inside diameter surface of each of the annular walls 38 is preferably the same, substantially matching the inside diameters of the inlet 22 and the outlet 24, and defining a substantially cylindrical shaped primary flow path that is complementary to the screen body 34. In this example, the modal attenuator 210 includes nine annular chambers 40 spaced apart along the length of the attenuator body 12; however more or fewer chambers 40 may be provided.

In this exemplary arrangement, the widths 47 of the chambers 40 are all the same. However, the widths 47 of the chambers 40 may be varied, such that some of the chambers 40 are wider or smaller than other chambers 40 along the length of the attenuator body 12.

In addition, the pattern of alternating heights 49 of the chambers 40 need not be limited to the pattern shown in FIG. 3. Rather, the heights 49 may, for example, alternate in groups of 2, 3, or more larger height chambers 40 and smaller height chambers 40. The heights 49 may for example alternate with different groupings of larger height chambers 40 and smaller height chambers 40.

As can be seen from the examples of FIGS. 1, 2, and 3, the pattern and mode of varying the volume of the chambers 40 along the length of the attenuator body 12 is not limited to any one of the specific examples, but may include different combinations of variations from any one of these examples and/or may not have a repeating pattern, may be random, or may have a pseudo-random pattern depending upon the specific acoustic frequencies it is desired to attenuate.

Figure 4:
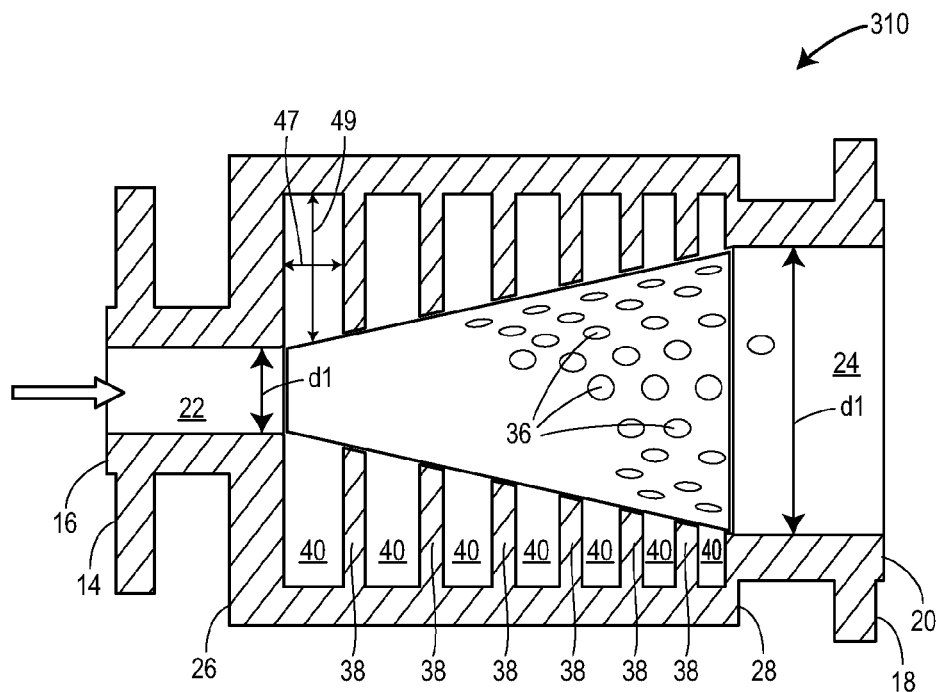
FIG. 4 is schematic longitudinal cross-sectional view along the lines A-A of FIG. 1 of a modal attenuator according to a yet another arrangement.

FIG. 4 illustrates another modal attenuator 310, which in this arrangement forms an expander section for inserting in-line between a first pipe (not shown) having a first, smaller diameter d1 at the inlet 22 and a second pipe (not shown) having a second, larger diameter d2 at the outlet 24. In this exemplary arrangement, identical or similar features are given the same reference number as in FIGS. 1-3 for ease of reference, and the description thereof is the same as provided above, except as otherwise noted herein. The modal attenuator 310 includes an attenuator body 12 extending from the inlet 22 to the outlet 24, a plurality of chambers 40 defined along the inner surface of the attenuator body 12, and a perforated screen 32 separating a primary fluid flow channel along the longitudinal axis of the attenuator body 12 from the chambers 40. The inlet 22 has a first inside diameter d1, and the outlet 24 has a second inside diameter d2 that is larger than the first inside diameter. The flange 14 is adapted for connection, for example with bolts, to a first size pipe, and the flange 18 is adapted for connection, for example with bolts, to a second, larger sized pipe. In this arrangement, the attenuator body 12 has a substantially cylindrical outer surface extending from a first end wall 26 to a second end wall 28. The first end wall 26 is in the form of a radial wall extending outwardly from the inlet 22 and the second end wall 28 is in the form of radial wall extending outwardly from the outlet 24. In other arrangements, the first and second end walls 26, 28 may be in the form of tapered sections, similar to the lead-in and lead-out sections 26, 28 shown and described previously.

The perforated screen 32 has a tapered shape having a smaller diameter at the inlet 22 and a larger diameter at the outlet 24. In the present arrangement, the perforated screen 32 has a screen body 34 in the form of a frusto-conical section. The screen body 34 extends from the inlet 22 to the outlet 24. The screen body 34 has the first diameter d1 at the inlet 22 and the second diameter d2 at the outlet 24. The perforated screen 32 is shown with perforations 36 in the form of holes, such as circular holes, through the screen body 34; however, the perforations 36 may be in any form capable of allowing transfer of acoustic waves therethrough laterally between the primary fluid flow channel and the chambers 40, such as any of the forms described previously herein.

The annular walls 38 extend radially inwardly from the inner surface of the attenuator body 12. The inner annular surfaces of the annular walls 38 at least partly define the primary fluid flow channel and the chambers 40, wherein the primary fluid flow channel expands from the inlet 22 toward the outlet 24. The diameters of the inner annular surfaces of the annular walls increase from the inlet 22 toward the outlet 24. In the present example, the annular walls 38 are successively shorter from adjacent the inlet 22 toward the outlet 24 such that the primary fluid flow channel expands in the direction of flow from the inlet 22 toward the outlet 24. In this arrangement, the inner diameters of the annular walls 38 define a frustoconical shape. The frustoconical shape defined by the inner annular surfaces of the annular walls 38 is complementary to the frustoconical shape of the screen body 34 of the perforated screen 32. Thus, the screen body 34 engages against the inner annular surfaces of the annular walls 38, thereby providing a complementary fit between the perforated screen 32 and the inner annular surfaces of the annular walls. In this way, the screen body 34 defines the outer annular surface of the primary fluid flow channel extending between the inlet 22 and the outlet 24. In addition, the chambers 40 in this arrangement extend radially inwardly all the way to the screen body 34, and each chamber 40 is isolated from the adjacent chambers 40 by the intervening annular wall 38 and the screen body 34. However, such a complementary fit between the screen body 34 and the inner annular surfaces of the annular walls 38 is not necessary, and in some arrangements there may be one or more gaps between the inner annular surfaces of the annular walls 38 and the screen body 34.

The volumes of the chambers 40 vary along the length of the attenuator body 12. In the present example, the volumes of the chambers 40 are successively smaller along the direction of flow from the inlet 22 to the outlet 24. Thus, the chambers 40 immediately adjacent the inlet 22 have a largest volume, the chambers 40 immediately adjacent the outlet 24 have the smallest volume, and the chambers 40 intermediate are successively smaller in volume between the largest volume chambers to the left and the smallest volume chambers to the right. The volumes of the chambers 40 may be varied by varying either or both of the height 49 of the annular walls 38 defining a chamber 40 and the width 47 of the chamber. In the present arrangement, the radial height 49 of each annular wall 38 is successively smaller such that the inner diameter surface of the annular walls 38 define a frustoconical shape extending from the inlet 22 to the outlet 24. However, the radial heights 49 of each annular wall 38 may vary to define other shapes or curves between the inlet 22 in the outlet 24. For example, the radial height 49 may vary to form a convex or concave elliptical shape, may form one or more groups of chambers 40 having the same height and forming step-like shapes, or may form other shapes that expand in the direction of fluid flow from the inlet 22 to the outlet 24. Preferably, the outer diameter of each of the annular walls 38 is substantially the same, for example, extending inwardly from a cylindrical outer wall of the attenuator body 12. However, in some arrangements the outer annular diameters of the annular walls 38 may not all be the same, thereby also affecting the volumes of the chambers 40. Also in this arrangement, some of the chambers 40 closer to the inlet 22 have the same width 47, and some of the chambers 40 closer to the outlet 24 have smaller widths 47 and larger widths 47. However, in other arrangements each chamber 40 may have the same width or one or more of the chambers 40 may have changing widths according to a pattern, randomly, or a pseudo-random pattern. For example, the widths 47 of the chambers 40 may also be successively smaller beginning at the left-most chamber 40 adjacent the inlet 22 and moving toward the right-most chamber 40 adjacent the outlet 24. As with the previous examples, the height 49 and width 47 of the chambers 40 may be selected to form a selected volume is desired to attenuate specific acoustic frequencies and/or groups of frequencies at any selected location along the length of the attenuator body 12.

Figure 5:
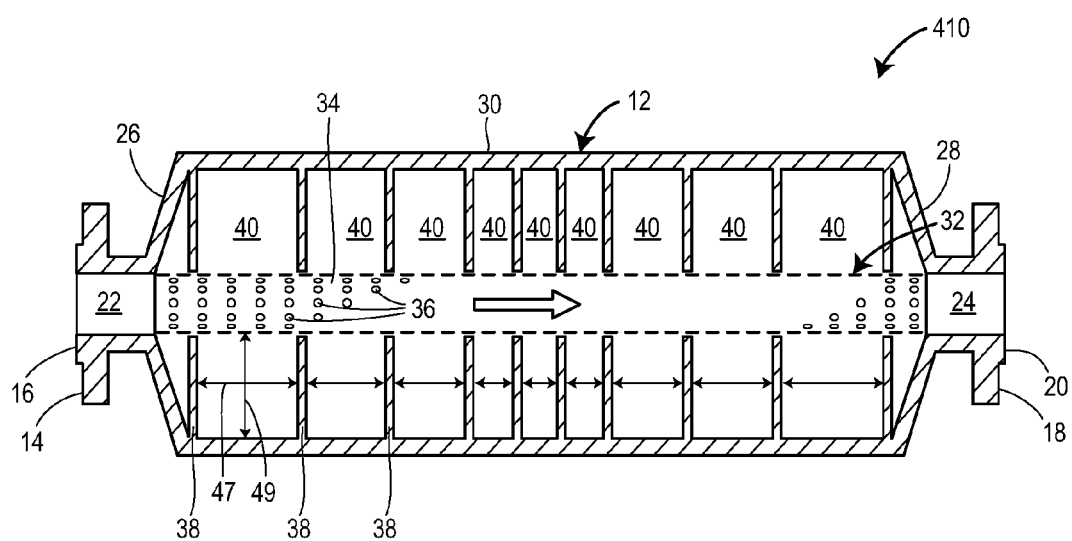
FIG. 5 is a schematic longitudinal cross-sectional view along the lines A-A of FIG. 1 of a modal attenuator according to a still further arrangement.

FIG. 5 illustrates another modal attenuator 410, in which the widths 47 of the chambers 40 vary successively along the longitudinal length of the attenuator body 12 from a largest width 47 at one or both of the left-most and right-most chambers 40 to a smallest width 47 at one or more of the intermediate chambers 40. In this exemplary arrangement, the modal attenuator 410 includes nine chambers 40 disposed along the length of the attenuator body 12 between the inlet 22 and the outlet 24; however, fewer or more chambers 40 may be disposed along the length of the attenuator body 30. The left-most chamber 40 immediately adjacent the inlet 22 has a first width 47, and the central chamber 40 has a second width 47 that is smaller than the first width. In this arrangement, there are three chambers 40 disposed between the left-most chamber and the central chamber, and the widths 47 of these three chambers are successively smaller from the left-most chamber 40 to the central chamber 40; however, some of the chambers from the left-most chamber 40 to the central chamber 40 may have the same width 47. In a similar manner, the right-most chamber 40 immediately adjacent the outlet 24 has a third width 47 that is larger than the second width 47 of the central chamber 40. Further, three chambers 40 disposed between the right-most chamber and the central chamber also have successively smaller widths 47 from the right-most chamber 40 to the central chamber 40; however, some of the chambers from the right-most chamber 40 to the central chamber 40 may have the same width 47.

In this arrangement, the modal attenuator 410 is adapted for in-line connection to two pipes having the same pipe diameter or size. Thus, the attachment flange 14 at the first end 16 and the attachment flange 18 at the second end 20 each have the same size, and the inlet 22 and the outlet 24 each have the same diameter. The intermediate segment 30 has a cylindrical outer wall, and all of the chambers 40 are disposed along the intermediate segment 30. Each annular wall 38 has the same height or inside diameter such that the inner annular surfaces of the annular walls 38 define a cylindrical primary flow path extending from the inlet 22 to the outlet 24. Preferably, each chamber 40 is an annular chamber that extends partly or completely around the primary flow path in a plane perpendicular to the axis of the primary flow path. The perforated screen 32 surrounds the primary flow path and extends along the length of the attenuator body 12 from the inlet 22 to the outlet 24. The perforated screen 32 has a cylindrical screen body 34 having the same diameter as the inlet 22 and the outlet 24. Other features of the modal attenuator 410 are substantially similar to the same numbered features as previously described with regard to other examples, the descriptions of which are not repeated here for the sake of brevity.

The exemplary arrangement shown in the drawings and described in detail herein are not intended to be limiting of the invention, but rather a provided as just one example out of many possible arrangements to enable the person of ordinary skill to make and use the invention. Additional arrangements, combinations of features, and/or advantages of the invention are contemplated within the scope of the claims appended hereto.

We claim:
1. A modal attenuator for reducing noise in a process system having fluid flowing through a pipe, the modal attenuator comprising:
   an inlet for in-line connection to a first pipe;
   an outlet for in-line connection to a second pipe;
   an attenuator body extending along a length from the inlet to the outlet and defining a primary fluid flow path from the inlet to the outlet;
   a perforated screen disposed inside the attenuator body, the perforated screen surrounding the primary fluid flow path from the inlet to the outlet; and
   a plurality of chambers spaced along the length of the attenuator body, the chambers defined between the attenuator body and the perforated screen, wherein each chamber has a width, a height, and an open end facing the perforated screen such that acoustic waves passing through the perforated screen can enter into the chamber through the open end;
   wherein the widths of the chambers increase in size successively from a first end chamber adjacent the inlet toward an intermediate chamber, and the widths of the chambers decrease in size successively from the intermediate chamber toward a second end chamber adjacent the outlet.

2. The modal attenuator of claim 1,
   wherein the plurality of chambers includes at least seven chambers spaced apart along the length the attenuator body.

3. The modal attenuator of claim 1,
   wherein the heights of the chambers increase progressively from each of the first end chamber and the second end chamber to the intermediate chamber.

4. The modal attenuator of claim 1,
   wherein the chambers are defined by a plurality of annular walls disposed on an inside surface of the attenuator body, and wherein the walls all have the same inside diameter defining a substantially cylindrical primary flow path.

5. A modal attenuator for reducing noise in a process system having fluid flowing through a pipe, the modal attenuator comprising:
   an inlet for in-line connection to a first pipe;
   an outlet for in-line connection to a second pipe;
   an attenuator body extending along a length from the inlet to the outlet and defining a primary fluid flow path from the inlet to the outlet;
   a perforated screen disposed inside the attenuator body, the perforated screen surrounding the primary fluid flow path from the inlet to the outlet; and
   a plurality of chambers spaced along the length of the attenuator body, the chambers defined between the attenuator body and the perforated screen, wherein each chamber has a width, a height, and an open end facing the perforated screen such that acoustic waves passing through the perforated screen can enter into the chamber through the open end; and wherein the widths of the chambers decrease in size successively from a first end chamber adjacent the inlet toward an intermediate chamber, and the widths of the chambers increase successively in size from the intermediate chamber toward a second end chamber adjacent the outlet.

6. A modal attenuator for reducing noise in a process system having fluid flowing through a pipe, the modal attenuator comprising:

an inlet for in-line connection to a first pipe;

an outlet for in-line connection to a second pipe;

an attenuator body extending along a length from the inlet to the outlet and defining a primary fluid flow path from the inlet to the outlet;

a perforated screen disposed inside the attenuator body, the perforated screen surrounding the primary fluid flow path from the inlet to the outlet; and a plurality of chambers spaced along the length of the attenuator body, the chambers defined between the attenuator body and the perforated screen, wherein each chamber has a width, a height, and an open end facing the perforated screen such that acoustic waves passing through the perforated screen can enter into the chamber through the open end; and wherein the depths of the chambers are staggered such that the heights of the chambers alternate along the length of the attenuator body between a larger height chamber and a smaller height chamber.

7. The modal attenuator of claim 6, wherein the widths of the chambers are all the same.

8. The modal attenuator of claim 6, wherein some of the chambers are wider than other of the chambers.

9. The modal attenuator of claim 6, wherein the chambers are defined by a plurality of annular walls disposed on an inside surface of the attenuator body, and wherein the walls all have the same inside diameter defining a substantially cylindrical primary flow path.

10. A modal attenuator in the form of an expander section for inserting in-line between a first pipe having a first diameter and a second pipe having a second diameter larger than the first diameter, the modal attenuator comprising:

an inlet for in-line connection to the first pipe, the inlet having the first diameter;

an outlet for in-line connection to the second pipe, the outlet having the second diameter;

an attenuator body extending along a length from the inlet to the outlet and defining a primary fluid flow path that expands from the inlet toward the outlet;

a perforated screen disposed inside the attenuator body, the perforated screen surrounding the primary fluid flow path from the inlet to the outlet; and a plurality of chambers spaced along the length of the attenuator body, the chambers defined between the attenuator body and the perforated screen, wherein each chamber has a width, a height, and an open end facing the perforated screen such that acoustic waves passing through the perforated screen can enter into the chamber through the open end.

11. The modal attenuator of claim 10, wherein a volume of each chamber decreases successively from a first end chamber adjacent the inlet with a largest volume to a second end chamber adjacent the outlet with a smallest volume.

12. The modal attenuator of claim 11, wherein at least one of the height and the width of the chambers is successively smaller in a direction of flow from the inlet to the outlet.

13. The modal attenuator of claim 10, wherein the chambers and the primary fluid flow channel are defined by a plurality of annular walls disposed on an inside surface of the attenuator body, and inner annular surfaces of the annular walls increase in diameter from the inlet toward the outlet.

14. The modal attenuator of claim 13, wherein the perforated screen comprises a screen body having a frustoconical shape that is complementary to the inner diameters of the inner annular surfaces of the annular walls.

15. The modal attenuator of claim 13, wherein the perforated screen comprises a screen body having a tapered shape that extends from the inlet to the outlet, the screen body having a smaller diameter at the inlet and a larger diameter at the outlet.

16. The modal attenuator of claim 15, wherein the screen body has the first diameter at the inlet and the second diameter at the outlet.

* * * * *